(12) United States Patent
Vaissie et al.

(10) Patent No.: US 6,433,760 B1
(45) Date of Patent: Aug. 13, 2002

(54) HEAD MOUNTED DISPLAY WITH EYETRACKING CAPABILITY

(75) Inventors: Laurent Vaissie; Jannick Rolland, both of Orlando, FL (US)

(73) Assignee: University of Central Florida, Orlando, FL (US)

( * ) Notice: Subject to any disclaimer, the term of this patent is extended or adjusted under 35 U.S.C. 154(b) by 0 days.

(21) Appl. No.: 09/470,778

(22) Filed: Dec. 23, 1999

Related U.S. Application Data (60) Provisional application No. 60/116,040, filed on Jan. 14, 1999.

(51) Int. Cl.$^7$ ................................................ G09G 5/00
(52) U.S. Cl. ........................................ 345/8; 359/630
(58) Field of Search ....................... 345/7, 8, 9; 359/13, 359/630, 631; 250/221; 340/980

(56) References Cited

U.S. PATENT DOCUMENTS

| | | | |
|---|---|---|---|
| 4,958,925 A | 9/1990 | Ober et al. .................. 351/210 |
| 5,224,198 A | 6/1993 | Jachinmosica et al. ...... 385/133 |
| 5,270,748 A | 12/1993 | Katz .......................... 351/210 |
| 5,331,149 A | 7/1994 | Spitzer et al. ............... 250/221 |
| 5,382,989 A | 1/1995 | Uomori et al. .............. 351/209 |
| 5,467,104 A | 11/1995 | Furness, III et al. ............ 345/8 |
| 5,585,872 A | 12/1996 | Kohayakawa ............... 351/212 |
| 5,625,372 A | 4/1997 | Hildebrand et al. ............ 345/8 |
| 5,635,176 A | 6/1997 | Hobbs et al. ................ 356/355 |
| 5,701,132 A | 12/1997 | Kollin et al. ................... 345/8 |
| 5,712,649 A | 1/1998 | Tosaki ........................... 345/8 |
| 5,717,413 A | 2/1998 | Mizouchi ....................... 345/7 |
| 5,790,284 A | 8/1998 | Taniguchi et al. ............. 359/15 |

*Primary Examiner*—Regina Liang
(74) *Attorney, Agent, or Firm*—Brian S. Steinberger; Law Offices of Brian S. Steinberger, PA (57) ABSTRACT

The eye-tracking system is based on the reflection of four light emitting diodes (LED)s at the cornea of user's eve. The LEDs emit infrared light at 900 nanometers and the virtual images formed behind the cornea as well as a near infrared image of the pupil are displayed on a charged couple device (CCD) sensor. The optical system used to display virtual environments is also used to conjugate the virtual images of the LEDs to the CCD sensor. This optimizes the integration of eyetracking system into the head mounted device (HMD). The four LEDs are laid out around the imaging (optical) system and their beam (rays) impinge directly on the eye by reflection on the hot mirror. Then the light reflected by the cornea is reflected again by the hot mirror, goes through the optical system and the cold mirror to be imaged on the sensor. The whole eye is illuminated by near infrared light and the contrast between the dark pupil and the bright iris on the CCD sensor allows knowledge of the location of the center of the entrance pupil. The processing of the location of the cornea images and the center of the entrance pupil leads to determine the sight direction.

17 Claims, 7 Drawing Sheets

HEAD MOUNTED DISPLAY WITH EYETRACKING CAPABILITY

This invention relates to head mounted optical eye tracking apparatus, and in particular to a method and apparatus for the display of a virtual image to a user's eyes while tracking at least one of the user's eyes to detect its sight direction and this Patent Application claims the priority of U.S. Provisional Application 60/116040 filed Jan. 14. 1999.

BACKGROUND AND PRIOR ART

In our electronic age, there is a continuing search to reduce the size of the instrumentation that can be used for electronic display of information to the user. The electronic display provides the user's eyes with an image, which can be either real or virtual. A real image refers to an image which is observed directly by the unaided human eye, e.g., a photograph or an electronic display as provided by a computer monitor. The virtual image is an image which, if a viewing surface were positioned at the apparent location of the virtual image, no image would be observed on the viewing surface. The virtual image facilitates enhanced miniaturization since the size or location of the viewing surface no longer limits its display location.

Head mounted virtual image display systems are well known as illustrated by: Jachinowicz et al in U.S. Pat. No. 5,224,198; Tosaki in U.S. Pat. No. 5,712,649; and Taniguchi et al in U.S. Pat. No. 5,790,284. In the classic head mounted display systems, the light rays emitted by the liquid crystal display (LCD) screen are directed by a lens onto a beam splitter. The beam splitter when oriented toward the user's eye enables the viewer to see the virtual image projected by the LCD Hildeband et al in U.S. Pat. No. 5,625,372 teaches a compact virtual image display system in which he combines a virtual image display and an eye tracker into a compact unit with a light emitting diode (LED) ring 58 about an optic lens 26 and an liquid crystal display (LCD) with feed back controls. Unfortunately, his system is not susceptible to head mounted displays. Furness, III et al in U.S. Pat. No. 5,467,104 describe in FIG. 4 an eye tracking device with a charged couple device (CCD) array detector but not useful for head mounted displays.

There exists a serious need for a head mounted, virtual image display system that will cooperatively provide eye tracking of the sight direction whereby physically challenged people can interact with devices. The sight direction information is also needed to enhance local images displayed in head mounted devices, correct for some depth perception difficulties, enhanced psychological studies by noting eye reactions to virtual image displays and increased resolution at the gaze point of visual displays.

SUMMARY OF THE INVENTION

The first objective of the present invention is to provide the user with a head mounted display that has an integrated eye-tracking function.

The second object of this invention is to provide a head mounted optical display system wherein the optical system provides a means to display the virtual image.

The third objective of this invention is to provide a head mounted optical display system with multiple infrared-emitting diodes positioned symmetrically around the optical system.

The fourth objective of this invention is to provide a head mounted, virtual image eye-tracking display system wherein the reflected infrared radiation is optically focused on a CCD sensor after reflection from the eye.

The primary embodiment of this invention is exemplified by a head mounted optical eye tracking apparatus for a user comprising in combination: an optical system means for displaying virtual images to a user's eye; and, means for tracking at least one, preferably both, of the user's eyes to determine sight direction.

The method of the invention includes the critical steps of displaying a virtual image to a user's eye, positioning a multiple infrared radiation eye-tracking display means peripherally of one imaging lens and imaging the user's eye to compute sight direction by means invisible to the user.

Further objects and advantages of this invention will be apparent from the following detailed description of a presently preferred embodiment, which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

As indicated in the discussion of the prior art, the head mounted display of virtual images is well known, e.g., see Jachinowicz et al in U.S. Pat. No. 5,224,198. This system is illustrated in FIG. 1 wherein the LCD screen 2 rays 3 are focused by an imaging 4 onto a beam splitter 5 which enables the viewer's eye 7 to see the virtual image 8 projected by the LCD screen 2.

Figure 1:
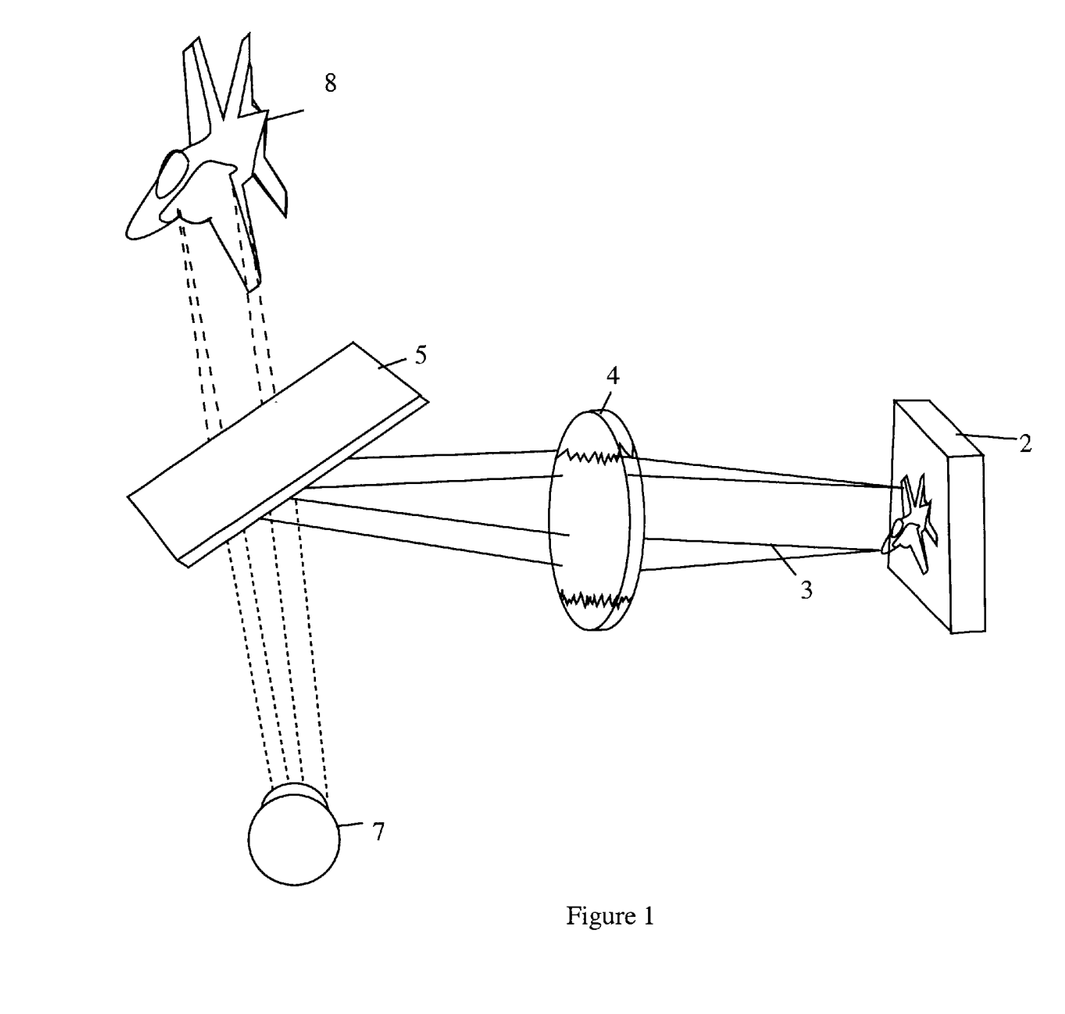
FIG. 1 is illustrative of a classic prior art head mounted display.
Figure 2:
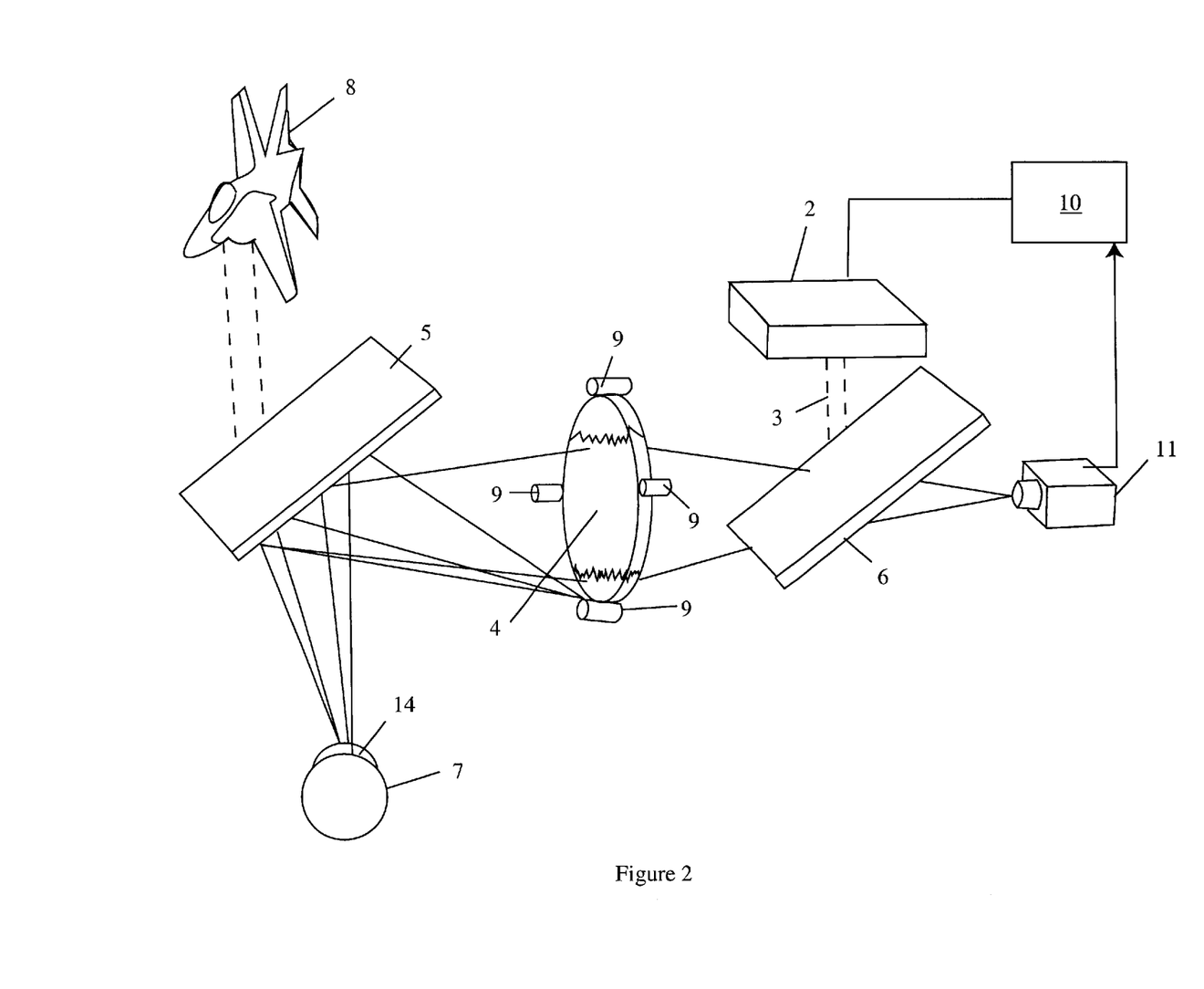
FIG. 2 is illustrative of the virtual image, eye-tracking system of the invention.

FIG. 2 illustrates the integrated virtual, eye-tracking system of the invention. This illustration shows the common features of the prior art FIG. 1 along with the liquid crystal display (LCD) rays 3, an imaging system 4 though modified with Light Emitting Diodes (LED) 9, a beam splitter (hot mirror) 5, the viewer's eye 7 and the virtual image 8. LEDs 9 can be VTE 3372 diodes available from EG&G Electronics. The additive features illustrated in FIG. 2 also includes the computer information processing portion 10 such as an IBM 486 using Light Tools Software, a (CCD) sensor 11 such as an XC-77 manufactured by Sony with a V-1056SX lens from Marshal Electronics, a second beam splitter (cold mirror) 6 and the previously noted LED diodes 9 that are positioned adjacent to and peripherally of the imaging system 4. Splitters/Mirrors 5, 6 can be splitters/mirrors manufactured by Edmund Scientific. To facilitate the understanding of the invention, an eye-tracking means has been integrated with a head-mounted display by laying out at least one, but preferably four, near infrared LEDs around the imaging system 4 used to display the virtual images. The LEDs form virtual images behind the cornea that are imaged on the CCD sensor through the same optical system as the one used to display virtual images of the LCD screen. The processing of the location of those images on the sensor allows determining the sight direction.

Figure 3:
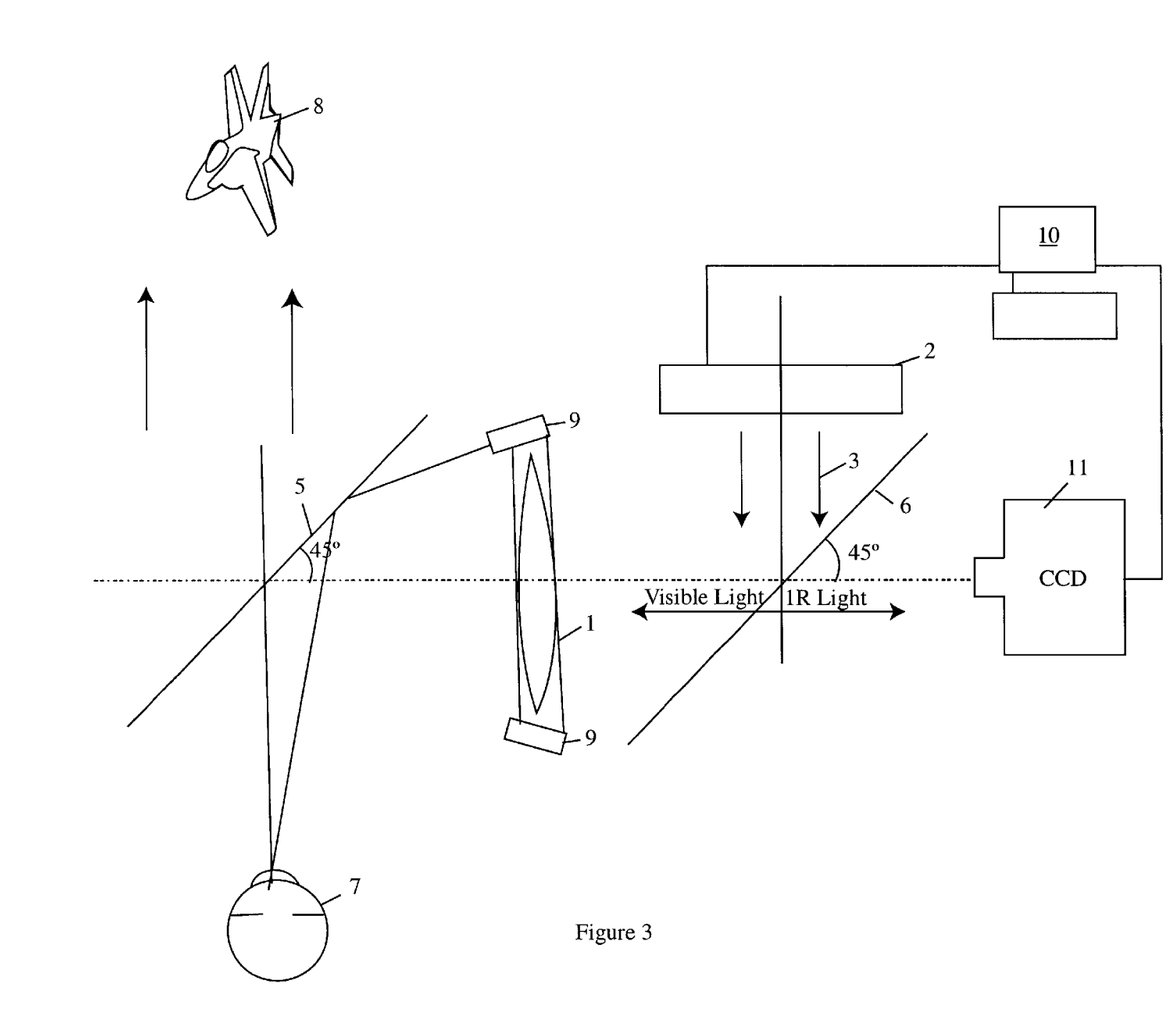
FIG. 3 shows an expanded illustration of the features of FIG. 2.
Figure 5:
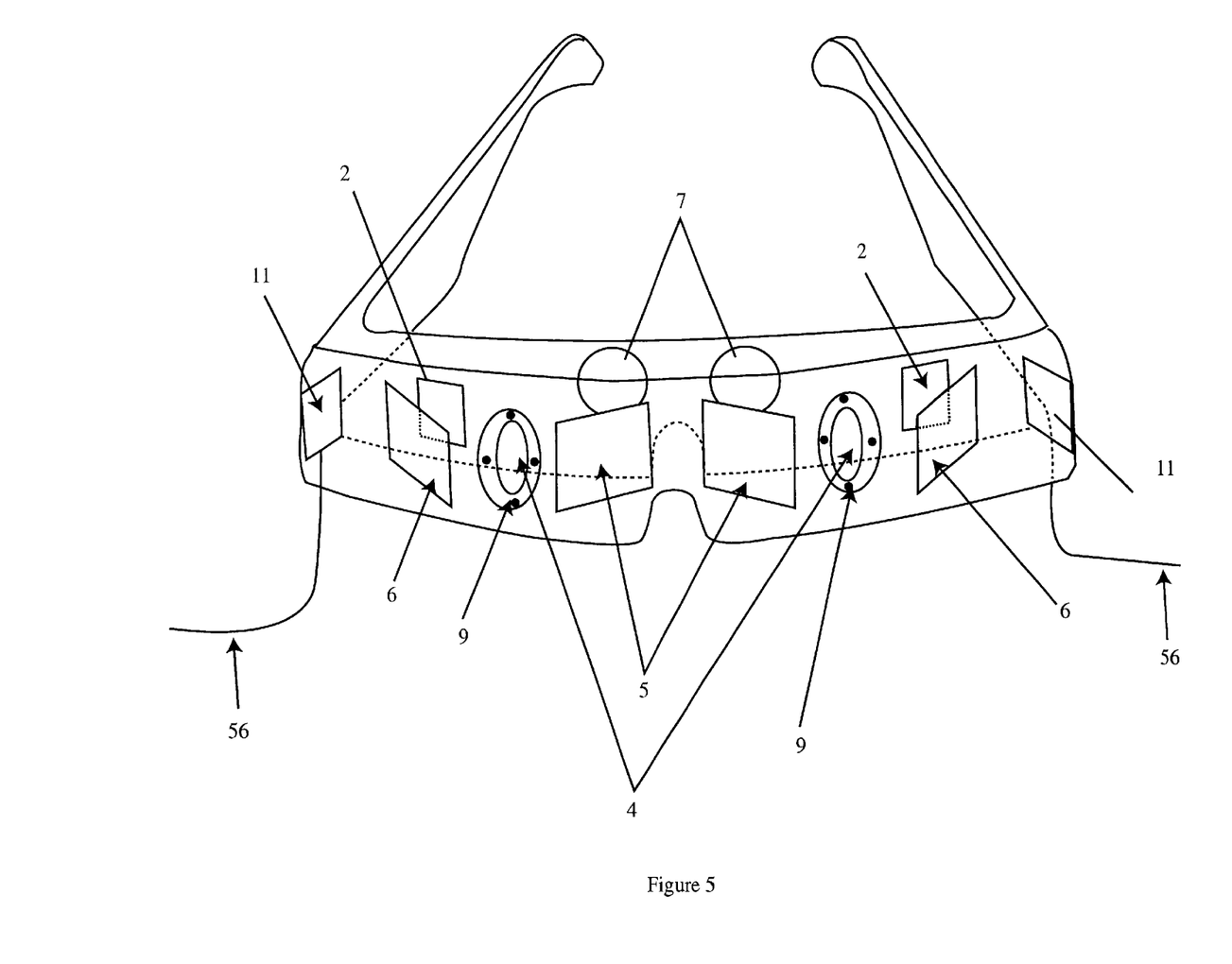
FIG. 5 is illustrative of the head-mounted structure.

Reference should now be made to FIG. 3 whose numerical designations are common to those used in FIGS. 1 and 2 and as will be seen in FIG. 5. In the succeeding discussion, both the preparation and operation of the eye-tracking virtual system of the invention will be laid out.

Now for the eye-tracking portion of the system of the invention. The LEDs 9 emit light at a wavelength equal to 900 nanometers which is reflected off the hot mirror 5 onto the cornea 14 of the eye 7. The reflected IR beam from the cornea 14 strikes the hot mirror 5 and is thereafter directed through the imaging system 4, passes through the cold mirror 6 (which reflects visible light and transmits the IR beam) and focused onto the CCD camera 11 where the beam (rays) data is processed by the computer 10 to determine the sight direction. The imaging lens of the imaging system 4 is shown as a single lens; however, it may be an imaging system 4 composed of several lenses. The hot mirror 5 transmits approximately 50% of the visible spectrum and as noted reflects approximately 100% of the IR light. The user's eye is imaged with near infrared light onto the CCD sensor 11.

The virtual image portion of the system is initiated by the LCD screen 2, which receives its visual information from the computer 10. The images on the LCD screen 2 are displayed by the imaging system 4 in the virtual environment. The rays 3 from the LCD screen 2 are reflected by the hot mirror 5 onto the cornea 14.

Figure 4:
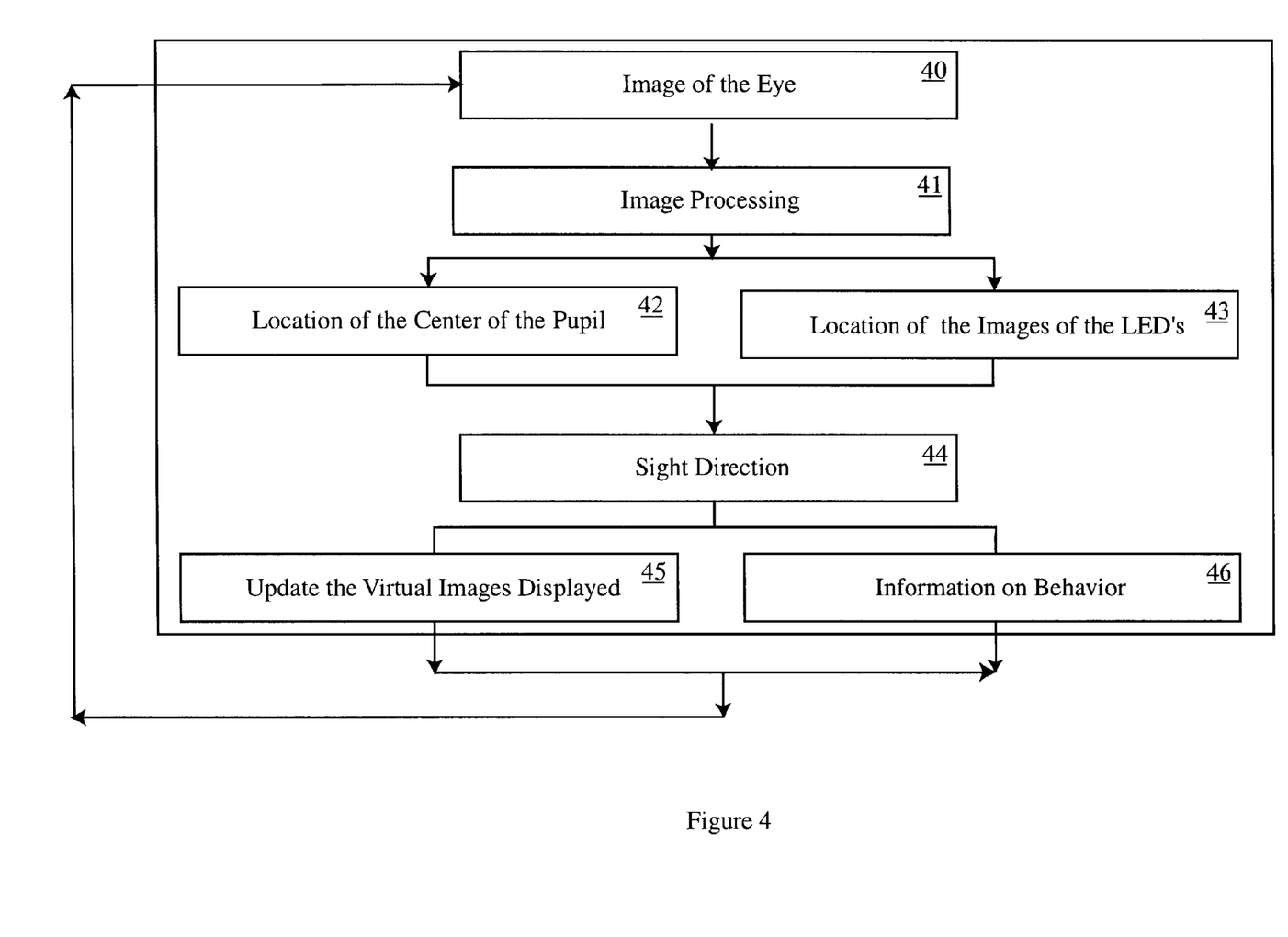
FIG. 4 details the sequence of sight information processing.

Reference should now be made to FIG. 4. The eye-tracking portion of the system of the invention processes the information as is seen in FIG. 4. The image of the eye 40 is processed through an image processing program 41 in computer 10 to provide data related to location of pupil 42 and the location 43 of the reflections of the LEDs. From this data, the sight direction of 44 is then applied to 45 to update the virtual environment and 46 for behavioural studies.

FIG. 5 illustrates a prototype of the device of the invention (head set) as would be positioned about the user's head with ear pieces 52 securing it in place. As earlier described in FIG. 3, the headset 54 is positioned on the head so that each eye 7 has LEDs 9 positioned peripherally around the imaging system 4 for beaming into each of the eyes 7 by reflection off hot mirror 5. This structure is positioned in the headset 54 and further includes as illustrated cold mirrors 6 and CCD sensors 11. The structure of FIG. 5 is electrically wired by wires 56 to computer 10 and LCD screen 2.

Figure 6:
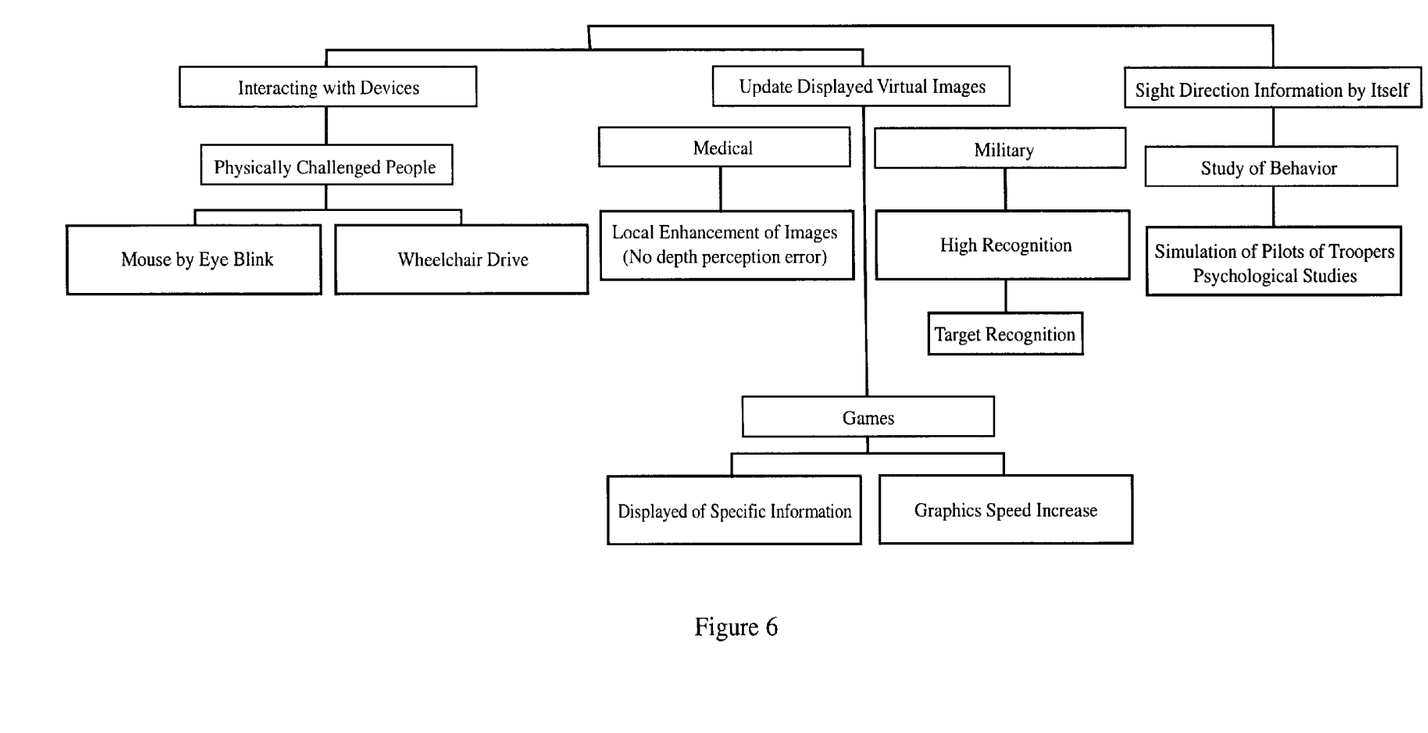
FIG. 6 sets forth the diverse applications of the invention.

FIG. 6 sets forth the many diverse and wide applications of the device and method of the invention.

Figure 7A:
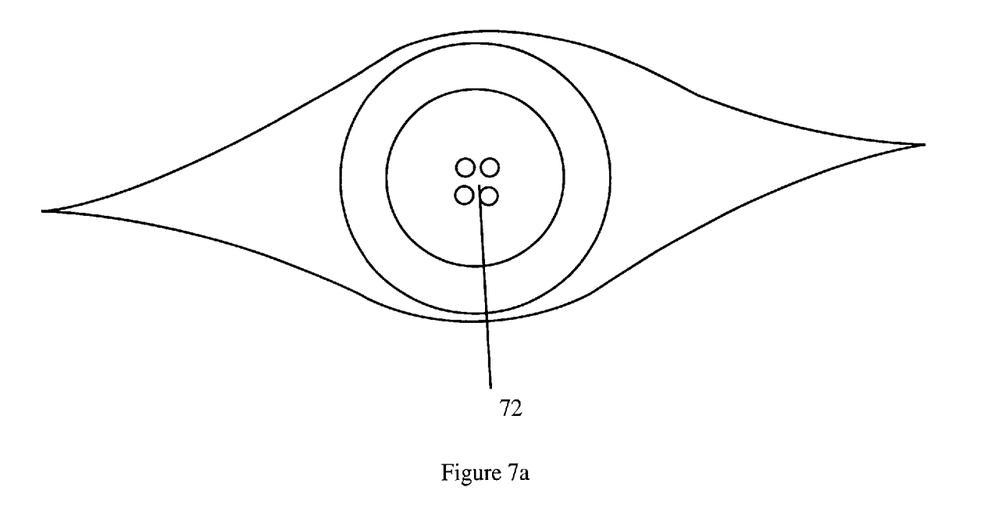
FIG. 7a shows four LEDs reflections on user's cornea when the user is gazing straight ahead.
Figure 7B:
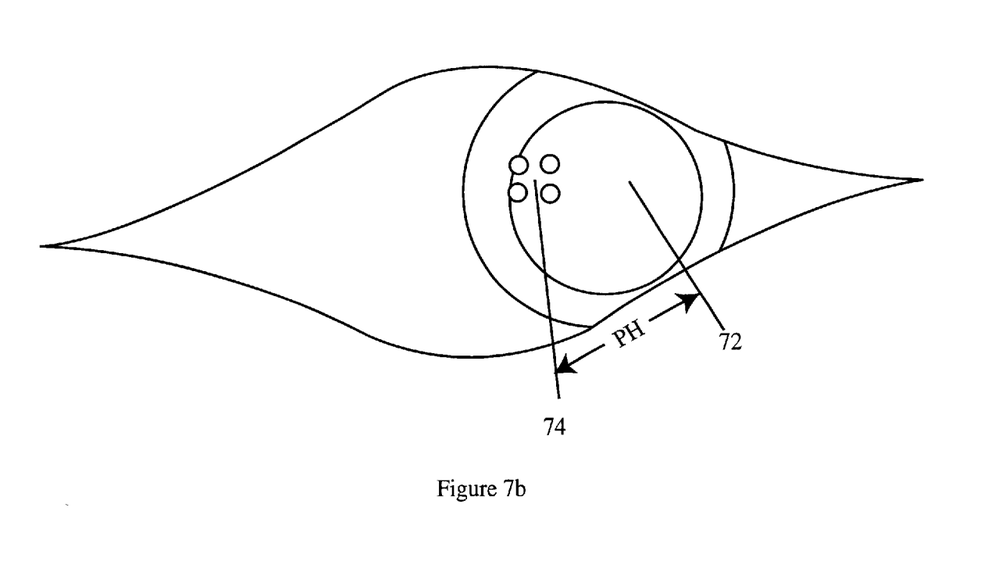
FIG. 7b shows four LEDs reflections on user's cornea when the user is gazing to the right.

FIG. 7a is representation of the image of the pupil, cornea and iris of a user's eye with the reflections of the 4 LEDs when the user gazes straight ahead. When the user is gazing off axis, the reflections of the 4 LEDs on an image of the pupil, cornea and iris of the user's eye is represented in FIG. 7b. Location of the LEDs when the eye rotates. By computing the location of the center 72, of the entrance pupil and the barycenter of the images of the LEDs, one can derive the vector PH, H being the projection of P, 72, center of the pupil, on the optical axis and determine the sight direction with respect to the axis of the reference point.

The device described herein is fully integrated and provides eye-tracking without occlusion of the field of view. It overcomes the defect of heavy weight and large size of previous head-mounted displays using eye-tracking. The use of four off-axis LEDs improves accuracy of tracking. FIG. 6 shows the extraordinary diversity of potential applications possible with the eye-tracking, virtual reality device described herein. Thus, the device can be used to interact with other devices: to assist physically challenged people; to update virtual images that are widely used by the military, medical industry and video games; and, to detect sight direction information which can be used in the study of behavior.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A head mounted optical eye displaying and tracking apparatus for a user comprising in combination:
   (c) optical system means for displaying virtual images to a user's eye;
   (d) means for near infrared tracking at least one of the user's eyes to determine sight direction, the tracking means including LEDs(light emitting diodes) positioned adjacent and uniformally about a perimeter of a lens; the LEDs for beaming light to reflect off a cornea of the user's eye to determine sight direction of the user's eye; and
   (c) means for mounting the optical system and the tracking system on a user's head, the mounting means including optical components common to both the optical system and the tracking system for operating along a common optical path, the optical components having only a beam splitter positioned in front of the user's eye to be used for the displaying of the virtual image in front of the user's eye and for the near infrared tracking of the user's eye, and the optical components including the lens being common to both the optical system and the tracking means with the lens not being positioned in front of the user's eye.

2. The apparatus of claim 1, wherein said optical system means includes:
   means to create a virtual image.

3. The apparatus of claim 1, wherein said optical system means includes:
   means to form a virtual image to the user's eyes that appears virtually in front of the user's eyes.

4. The apparatus of claim 1, further comprising:
   means to detect reflected infrared light from the user's eyes to determine location of gaze direction of the eyes.

5. The apparatus of claim 4, further comprising:
   means to focus the reflected light to the tracking sensor.

6. The apparatus of claim 1, wherein the LEDs include:
   four LEDs positioned adjacent to and uniformly about the perimeter of the lens.

7. The apparatus of claim 1, wherein the common beam splitter for the optical system means and the tracking means includes:

a common mirror having the property of reflecting approximately 50% of the visible light and approximately 100% of the near infrared light.

8. The apparatus of claim 1, wherein the optical system means and the tracking means include: a common cold mirror which reflects visible light and transmits an infrared beam.

9. The apparatus of claim 1, wherein the common beamsplitter of the optical system means and tracking means includes: a common wavelength dependent beamsplitter.

10. The apparatus of claim 1, wherein the common optical components of the optical system means and the tracking means include:

a common cold mirror, the common lens and the common beamsplitter.

11. A method for eye-tracking a viewer's eye response to a virtual image with common optical components in a head mounted display comprising the steps of:

displaying a virtual image from a display means, to appear in front of the viewer's eyes;

beaming infrared radiation beams from an eye-tracking means to the viewer's eyes;

reflecting light from the beams off the corneas of the viewer's eyes;

tracking the viewer's eyes responsive to said virtual image and said reflecting light, thereby detecting sight directional change by means invisible to the viewer; and using common optical components for the displaying of the virtual image and the beaming of the infrared radiation and the tracking of the viewer's eyes along a common optical path, the common optical components include a common beamsplitter, wherein only the common beamsplitter is positioned in front of the viewer's eyes.

12. The method according to claim 11, wherein the beaming step further includes:

beaming infrared radiation from a plurality of LED's.

13. The method according to claim 12, wherein the beaming step includes:

beaming near infrared radiation from four LEDs positioned equidistant from about a common lens to each of the viewer's eyes.

14. The method of claim 11, wherein the common beam splitter reflects approximately 50% of the visible light and reflects approximately 100% of the near infrared light.

15. The method of claim 11, wherein using the common optical components further includes the step of: using a common mirror.

16. The method of claim 15, wherein the common mirror includes:

using a cold mirror that reflects visible light and transmits infrared light.

17. The method of claim 11, wherein the step of using the common optical components further includes the step of:

using a common mirror and a common lens.

\* \* \* \* \*